Aug. 11, 1959  KIYOSHI KITAHARA  2,898,663
METHOD OF PRODUCING NARROW FABRICS BY CUTTING A SPECIALLY
WOVEN WIDE FABRIC CONTAINING SYNTHETIC FIBRE
WEFTS, BY THE AID OF ELECTRICAL HEATING OF
INTERWOVEN METAL WIRES

Filed Dec. 26, 1956  4 Sheets-Sheet 1

INVENTOR.
K. Kitahara
BY
ATTYS.

Aug. 11, 1959 KIYOSHI KITAHARA 2,898,663
METHOD OF PRODUCING NARROW FABRICS BY CUTTING A SPECIALLY
WOVEN WIDE FABRIC CONTAINING SYNTHETIC FIBRE
WEFTS, BY THE AID OF ELECTRICAL HEATING OF
INTERWOVEN METAL WIRES
Filed Dec. 26, 1956 4 Sheets-Sheet 2
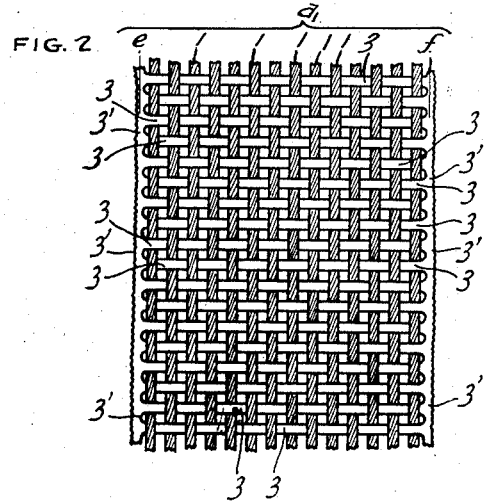
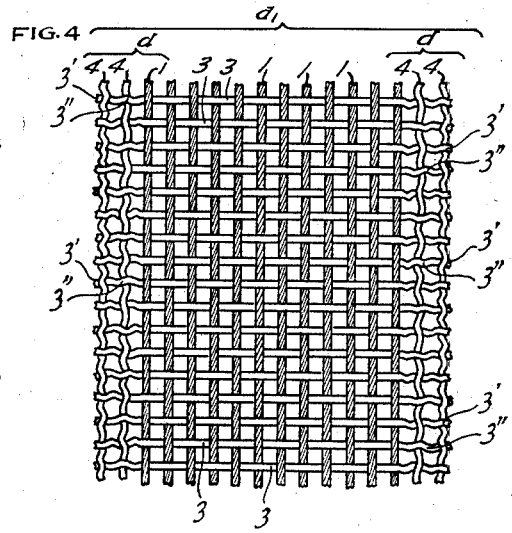
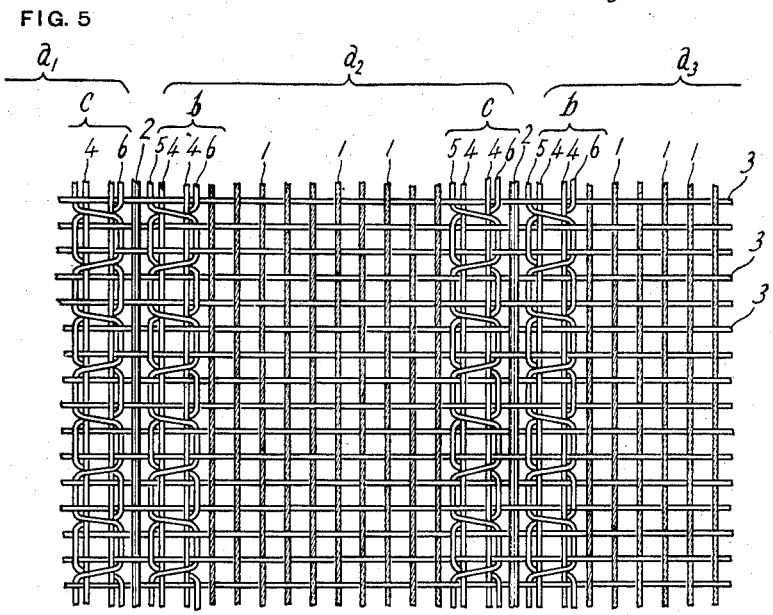
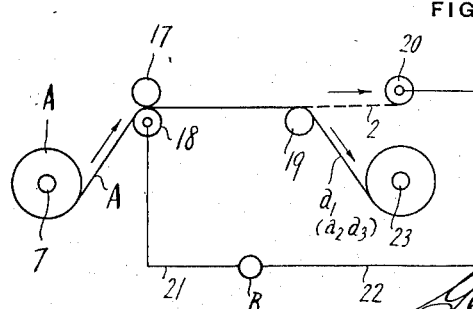
INVENTOR.
K. Kitahara
BY
ATTYS.

Aug. 11, 1959   KIYOSHI KITAHARA   2,898,663
METHOD OF PRODUCING NARROW FABRICS BY CUTTING A SPECIALLY
WOVEN WIDE FABRIC CONTAINING SYNTHETIC FIBRE
WEFTS, BY THE AID OF ELECTRICAL HEATING OF
INTERWOVEN METAL WIRES

Filed Dec. 26, 1956                                    4 Sheets-Sheet 3

INVENTOR.
K. Kitahara
BY
ATTYS.

Aug. 11, 1959
KIYOSHI KITAHARA
2,898,663
METHOD OF PRODUCING NARROW FABRICS BY CUTTING A SPECIALLY
WOVEN WIDE FABRIC CONTAINING SYNTHETIC FIBRE
WEFTS, BY THE AID OF ELECTRICAL HEATING OF
INTERWOVEN METAL WIRES
Filed Dec. 26, 1956
4 Sheets-Sheet 4
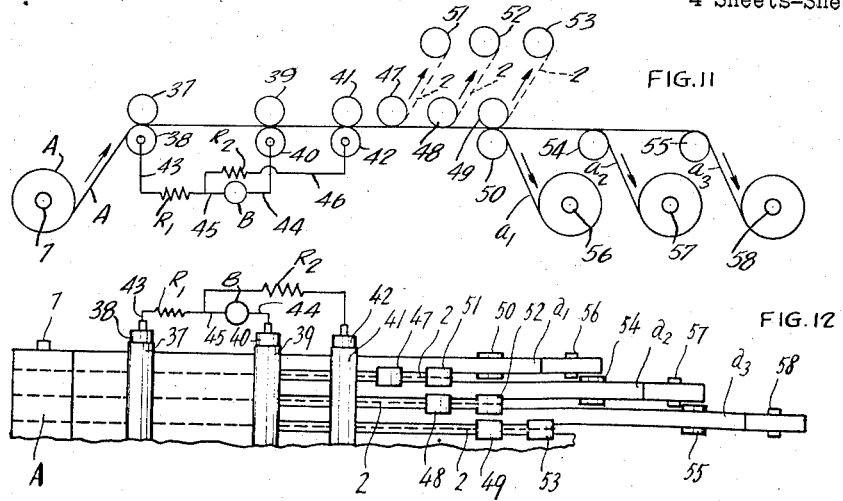
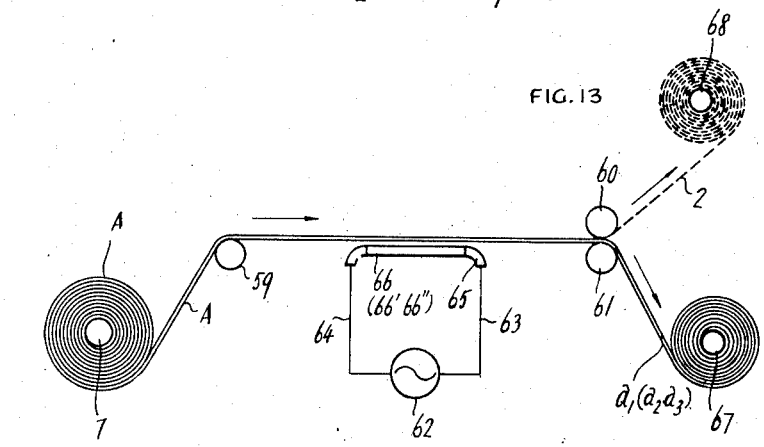
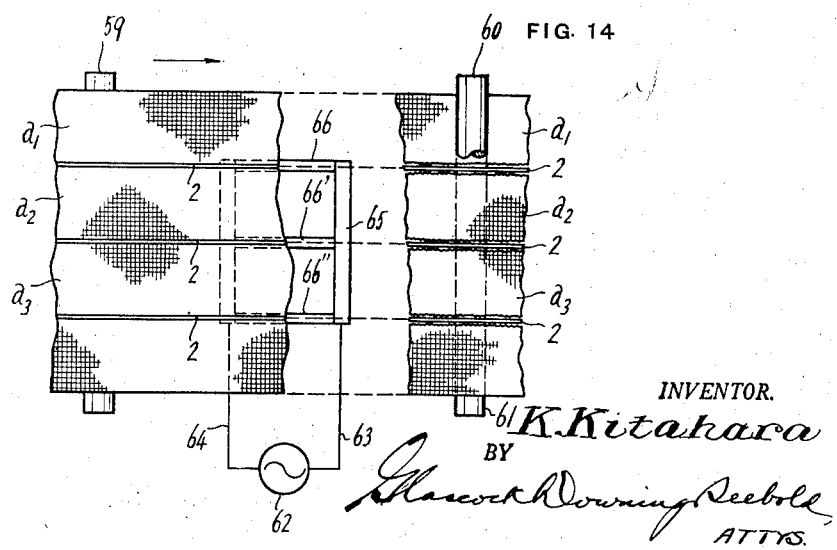
INVENTOR.
K. Kitahara
BY
ATTYS.

United States Patent Office 2,898,663
Patented Aug. 11, 1959

2,898,663

METHOD OF PRODUCING NARROW FABRICS BY CUTTING A SPECIALLY WOVEN WIDE FABRIC CONTAINING SYNTHETIC FIBRE WEFTS, BY THE AID OF ELECTRICAL HEATING OF INTERWOVEN METAL WIRES

Kiyoshi Kitahara, Tokyo, Japan

Application December 26, 1956, Serial No. 630,659

Claims priority, application Japan June 4, 1956

5 Claims. (Cl. 28—72)

It is the object of the present invention to provide an easy and speedy method of producing narrow fabrics such as ribbons, tapes etc., without using customary narrow fabric looms, but by weaving primarily a special wide fabric containing synthetic fibre yarns as wefts and some metal wires parallel with warp threads, and secondly by cutting the primary wide fabric thus woven by the aid of electrical heating of the interwoven metal wires.

The characteristics of the method are primarily to weave such a special wide fabric so that the warp threads of required material are parted into a requisite number of groups. Each group has the number of threads corresponding to the width of narrow fabrics to be produced, and the metal wires interwoven are respectively located, parallel to the threads, between the successive warp thread groups. Whenever necessary, each warp thread group may be accompanied by two or three thermally plastic synthetic fibre yarns on both its sides, while the weft threads are always adopted thermally plastic synthetic fibre yarns. Additionally, the characteristics are to cut the weft threads of the primary wide fabric by electrical heating of the metal wires interwoven, so that the weft threads of thermally plastic synthetic fibre are fused and cut at the points in contact with the metal wires. The cut end parts are fused together with one another to make a neat selvage, whereas when there are inserted a few warp threads of synthetic fibre on both sides of each warp group, they also become adequately softened and are glued together with the cut end parts of the wefts to make a neat and stiff selvage. The method of cutting a wide fabric according to the present invention, in which metal wires are interwoven, keeping a certain required spacing and parallel to warp threads and are heated by an electric current to fuse and cut weft threads of synthetic fibre perpendicular to their lines at the points in contact with the metal wires so as to produce neatly selvaged narrow fabrics, may be especially suitable for an easy and speedy production of narrow fabrics such as ribbons, tapes etc.

The embodiments of the present invention will be given in the following with reference to the accompanying drawing in which:

Figure 2 is a fragmentary plan view of a fabric piece of the type shown in Figure 1 after cutting;

Figure 4 is a fragmentary plan view similar to Figure 2 of the fabric piece shown in Figure 3;

Figure 5 is a fragmentary plan view of still another fabric piece made in accordance with the invention;

Figure 9 is a diagrammatic side elevational view of a further form of cutting apparatus;

Figure 11 is a diagrammatic view in side elevation of still another form of cutting apparatus;

Figure 12 is a fragmentary plan view of the apparatus shown in Figure 11;

Figure 13 is a diagrammatic view in side elevation illustrating yet a further form of cutting apparatus; and, Figure 14 is a fragmentary plan view of the apparatus shown in Figure 13.

Three examples of primary fabrics woven especially for the purpose of cutting will be described initially.

Figure 1:
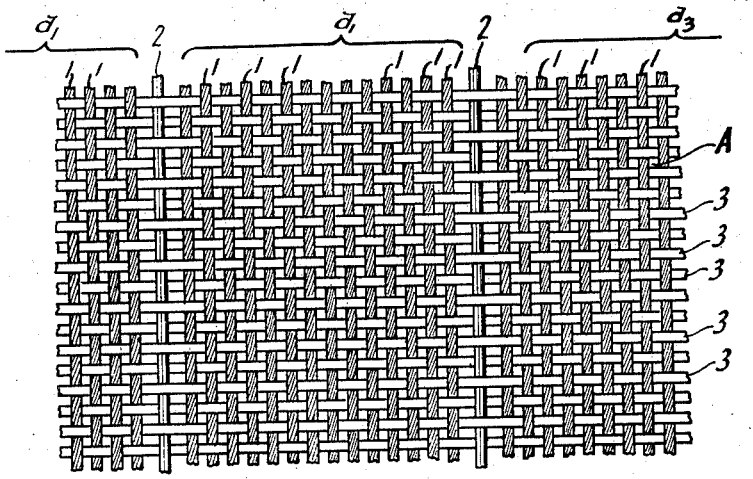
Figure 1 is a fragmentary plan view of a fabric piece according to the present invention.

The first example of such wide fabrics is shown in Fig. 1, where the parts $a_1$, $a_2$, $a_3$ . . . represent successive groups of warp threads 1 which may be ordinary silk, synthetic fibre, cotton, wool or any other yarns (the warp yarns such as mentioned above will hereafter be described simply as ordinary warp threads), the number of the warp threads in each group corresponding to the required width of narrow fabrics to be produced. A metal wire 2 such as, in general, of iron or of copper is located between the successive warp thread groups, while weft threads 3 are always interwoven thermally plastic synthetic fibre yarns such as the polyamide, vinyl or acetate series.

Figure 3:
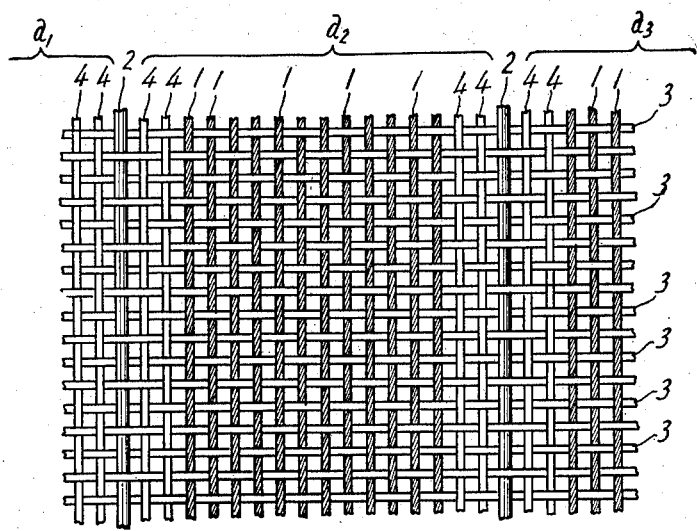
Figure 3 is a fragmentary plan view of a fabric piece of a further form of the invention.

The second example of such primary wide fabrics is shown in Fig. 3, where warp threads groups $a_1$, $a_2$, $a_3$ . . . are seen to be more complex than those of the above example, i.e., each of the warp groups is composed of the required number of ordinary warp threads 1 and of a few thermally plastic synthetic fibre yarns 4 which are located on both sides of ordinary warp threads. As before, metal wires 2 are interwoven respectively between the successive warp groups, and the weft threads are woven thermally plastic synthetic fibre yarns 3.

The third example of such primary wide fabrics is shown in Fig. 5, where the parts $a_1$, $a_2$, $a_3$ . . . are composed respectively of an ordinary warp thread group and of somewhat complicated side portions of the warp group, i.e., each side portion $b$ or $c$ is composed of a few number of thermally plastic synthetic fibre yarns 4 as straight warps which are entwined by synthetic fibre yarns 5 and 6 of the same kind as the warp 4. Metal wires 2 are interwoven between the neighbouring side portions $b$ and $c$, with the weft threads 3 being all thermally plastic synthetic fibre yarns as above.

The primary fabric woven in one of the forms shown in the above examples will be treated thermally by one of the arrangements shown in Figs. 7–13 to be cut into the required narrow fabrics with neat selvages. The five fabric cutting arrangements shown in Figs. 7–13 are in principle substantially similar, but according to their differences in design, they have respective advantages in the cases of actual applications. Taking the sample shown in Fig. 1 as an example of primary wide fabric, the way of cutting by the different arrangements will be explained in the following.

Figure 10:
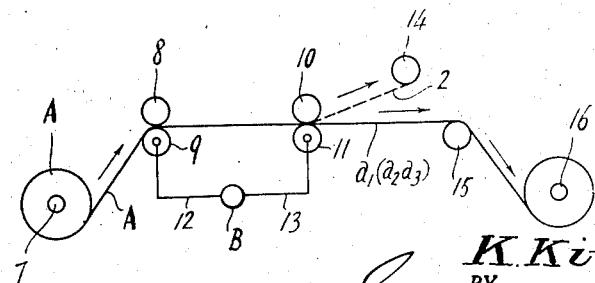
Figure 10 is a diagrammatic side elevational view of the cutting apparatus shown in Figure 8.

*Example 1* (By the arrangement shown in Fig. 10).—As shown in Fig. 10 a primary wide fabric A wound on a spool 7 is drawn to pass between rollers 8 and 9 and then between rollers 10 and 11. In the region of the fabric running between the two pairs of rollers, weft threads are cut at the points in contact with electrically heated metal wires interwoven in the fabric. As the two pairs of rollers or at least one roller of each pair, e.g. 9 and 10, are made of metal, the electric current from a source B is led, if in the latter case, through a conducting wire 12 to the roller 9 and is conducted directly into all the metal wires interwoven, flowing in parallel through them, and then returns through the roller 11 and a conducting wire 13 to the source B. While the primary fabric is passing through the portion between the rollers 9 and 11, the weft threads of thermally plastic synthetic fibre are heated by the current bearing metal wires, which are in contact with them and are elevated to the temperature of 150°–200° C. This results in the weft threads being fused and cut, and the cut end parts in the fused state are united together to form neat selvages for the ribbon-like narrow fabrics produced. Though the melting points of different kinds of synthetic fibres are somewhat different, nearly all kinds of synthetic fibres are found to be fused and cut when treated in the temperature range of 150°–200° C. for several seconds. When weft threads are thus cut, ordinary warp thread groups $a_1, a_2, a_3 \ldots$ are separated from one another as shown in Fig. 10, and ribbon- or tape-like narrow fabrics separated, are, after passing round a guide roller 15, wound on a winding spool 16. The metal wires freed from the primary fabric are also made to be wound on a winding spool 14.

Whenever it is necessary to secure better electrical contact between the rollers and the metal wires interwoven in a primary fabric, two pairs of rollers 8 and 9, and 10 and 11, all made of metal, are employed so that the rollers of each pair are electrically connected and as a result the electrical contact between the rollers and the metal wires may be assured. In order to wind up smoothly and synchronously the freed metal wires on the spool 14 and the separated narrow fabrics on the spool 16, special attention has been taken to regulate the rotational velocities of the spools 14 and 16.

Example 2 (By the arrangement shown in Fig. 9).—In this design of arrangement there are, instead of the rollers 8 and 9 shown in Fig. 10, one pair of rollers 17 and 18, and instead of the rollers 10 and 11 shown in the figure, a spool 20 shown in Fig. 9, made of metal, for winding metal wires freed from a primary fabric. The spool 20 serves as one electrode for the electric current flowing through the interwoven metal wires. A primary wide fabric A from a winding spool 7 passes, as shown in Fig. 9, between the rollers 17 and 18 (at least one 18 is made of metal) to a guide roller 19. After it is cut as in Ex. 1 during the passage through the region between the roller 18 and the guide roller 19, ribbon- or tape-like narrow fabrics $a_1, a_2, a_3 \ldots$ are sent by the roller 19 and wound on a winding spool 23. The heating current in this case is supplied from a current source B to the metal roller 18 by a leading wire 21 and by a wire 22 to the winding metal spool 20. The position of the spool 20 is so selected as to be able to draw the metal wires freed from the primary fabric in the plane of the sliding fabric as shown in Fig. 9, and the contact between narrow fabrics cut and the guide roller 19 being thus kept fairly well. As described above, the arrangement of this example, in which the spool 20 serves both as a winding spool for metal wires freed and as an electrode for the heating current, is naturally much simpler than that described in Ex. 1.

Figure 7:
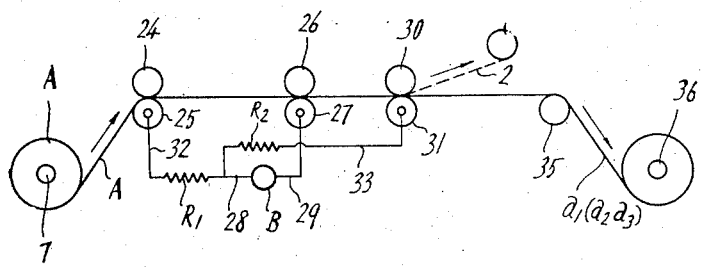
Figure 7 is a diagrammatic side elevational view of one form of a cutting apparatus.
Figure 8:
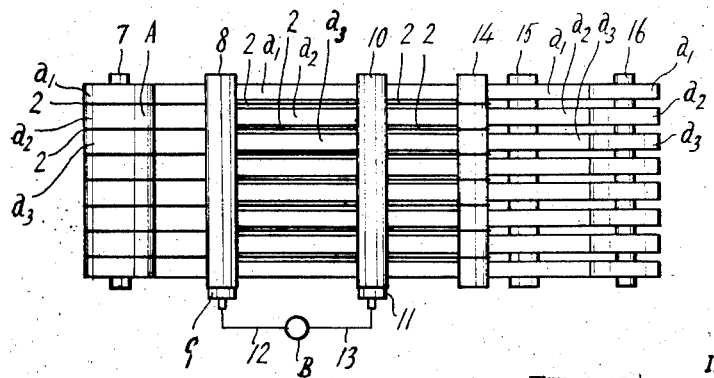
Figure 8 is a plan view of the apparatus shown in Figure 10.

Example 3 (By the arrangement shown in Fig. 7).—A primary wide fabric A from a winding spool 7 passes, as shown in Fig. 7, through three pairs of rollers 24 and 25, 26 and 27, and 30 and 31 and is adequately preheated in the region between the first and the second pairs of rollers 24 and 25, and 26 and 27 until the synthetic fibres (mainly the weft threads at the points of contact with the heating metal wires) approach the state of fusion. Then, the weft threads of the primary fabric are thoroughly fused and cut in passing the region between the second and the third pairs of rollers 26 and 27, and 30 and 31. As shown in Fig. 7, the heating current in the metal wires in the first region is supplied from a current source B through a leading wire 28, a resistance $R_1$ and a leading wire 32 to the roller 25, and through a wire 29 to the roller 27. In the second region the current passes through the leading wire 28, a resistance $R_2$ and a wire 33 to the roller 31, and through the wire 29 to the roller 27. The intensities of the heating current in the two regions can be suitably adjusted by the resistances $R_1$ and $R_2$ respectively. The narrow fabrics thus cut $a_1, a_2, a_3 \ldots$ are guided by a guide roller 35, wound on a winding spool 36, and the metal wires 2 freed from the fabric on a spool 34. Because of the fact that the preheating is applied, the weft threads of synthetic fibre may be heated and softened up to points somewhat distant from their cut ends, and therefore the process of cutting by this arrangement may be suitable for treating a primary wide fabric of the type shown in Fig. 3 or Fig. 5.

Example 4 (By the arrangement shown in Figs. 11 and 12).—The process of cutting a primary wide fabric in this arrangement and its benefit in the practical application due to the adoption of preheating are quite similar to those of the arrangement described in Example 3. The only differences are in that narrow fabrics separated $a_1, a_2, a_3 \ldots$ and freed metal wires 2 are all wound one to one on different winding spools. As shown in the side view (Fig. 11) and in the diagram (Fig. 12) of the partial horizontal projection, a primary wide fabric A drawn from a winding spool 7 is subjected as in the last example to the treatments of primary and secondary heating during the passages between the pairs of rollers 37 and 38, and 39 and 40, and also between the pairs 39 and 40, and 41 and 42 respectively. The narrow fabric $a_1, a_2, a_3 \ldots$ separated by the thermal treatment and guided by guide rollers 50 and 54 and 55, are wound on respective winding rollers 56, 57 and 58 separately, and the metal wires 2 freed from the primary fabric are led by guide rollers 47, 48 and 49 to winding spools 51, 52 and 53 respectively.

Example 5 (By the arrangement shown in Figs. 13 and 14).—In this arrangement, the cutting of a primary wide fabric is performed by the high frequency current induced in the heating metal wires 2 interwoven in the fabric. A wide fabric A from a winding spool 7 proceeds as shown in Fig. 13, guided by a guide roller 59, to a pair of rollers 60 and 61. The primary current from a high frequency oscillator 62 is led as shown in Figs. 13 and 14 by leading wires 63 and 64 to a metal frame work 65 which is located in the central portion between the rollers 59 and 61 and is arranged immediately under and parallel to the plane of the moving primary fabric. This framework is composed of end frame parts and longitudinal parts 66, 66' and 66", and each supports a respective leading wire. The number of the longitudinal frame parts corresponds to the number of metal wires interwoven in the fabric. (The diagram shown in Fig. 14 is described, as an example, in the case of three longitudinal frame parts 66, 66' and 66" for three metal wires.) The frame work 65 is so constructed that the longitudinal frame parts, having a certain adequate length, are movable perpendicular to their length and so the transverse distances between them can be varied freely according to the width of narrow fabrics to be produced. When the high frequency primary current is excited by the oscillator 62 in the leading wires connected to the longitudinal frame parts 66, 66', 66", the high frequency secondary current is induced in the metal wires 2 interwoven, and the portions of the metal wires immediately above and in the neighbourhood of the frame work 65 can be appropriately heated to fuse and cut the weft threads of synthetic fibre as mentioned in the above examples. The narrow fabrics separated $a_1, a_2, a_3 \ldots$ are wound on a winding spool 67 and the metal wires 2 freed from the primary fabric on a winding spool 68. If we apply, in addition to the inducing frame work 65, another similar frame work immediately on the upper side of the running primary wide fabric, the induced current in the heating metal wires 2 can be greatly increased. In this method of heating due to the high frequency induction current, the heat evolution in the metal wires 2 interwoven in the primary fabric is localized only in the parts of wires immediately above and in the neighbourhood of the current inducing frame work 65, and therefore as shown in Fig.

13, all the rollers employed remain completely outside of the current circuit so that the fabric cutting treatment and the fabric or the wire winding operation in the arrangement can proceed quite smoothly. As a result, the narrow fabrics to be produced can be quite neatly finished.

The above-described five different processes of cutting a primary wide fabric to obtain narrow fabrics with neat selvages are generally similar in principle, but each of them has a respective advantage in its practical application.

The process of cutting a specially woven wide fabric will now be more closely described. By the heating of metal wires 2, weft threads 3 of thermally plastic synthetic fibre are gradually softened, nearly fusible and then cut wherever they are in contact with interwoven metal wires. As shown in Fig. 2, a cut end part of one weft thread 3, for example, is fused together with a neighbouring one of another thread to form a bridge-like portion 3′. Since such is the case with every cut end part of the weft threads 3, the cut end parts of the weft threads of a narrow fabric produced, $a_1$ for example, will form continuous neat edges (selvages) $e$ and $f$ on both sides of the fabric respectively (Fig. 2). After the primary wide fabric is thus cut, separated narrow fabrics neatly selvaged are wound on a winding spool, while metal wires freed from the fabric are wound on another winding spool. On heating thermally plastic synthetic fibre yarns, they become at first slightly elongated and, on further heating, each yarn becomes curly as shown in Fig. 4, growing softened and viscous. Attaining to the range of temperature 150°–200° C. synthetic fibre yarns begin to be fused and cut at the points of contact with metal wires, remaining glassy small balls of fused synthetic resin on the cut end parts. The fused glassy small balls at the ends of cut weft threads are united together one by one to form in the end continuous stiff edges (selvages) $e$ and $f$ as shown in Fig. 2.

When a primary wide fabric woven as shown in Fig. 3, where a few warp threads of synthetic fibre are interwoven in the neighbourhood of metal wires 2, is thermally treated as above mentioned, both the weft threads 3 in the neighbourhood of heated metal wires as well as the warp threads 4 of synthetic fibre become gradually softened and fairly viscous. After the weft threads 3 are fused and cut at the points in contact with metal wire 2, the cut end parts will easily adhere to the warp threads 4 which are already heated to be quite viscous. The warp threads 4 of synthetic fibre heated to be in the curly form as shown in Fig. 4 will be fused together twiningly with the curly cut end parts such as 3′ and 3″ of the weft threads 3, also in the heated state, to give a firm fine selvage $d$ to the narrow fabrics to be produced.

Figure 6:
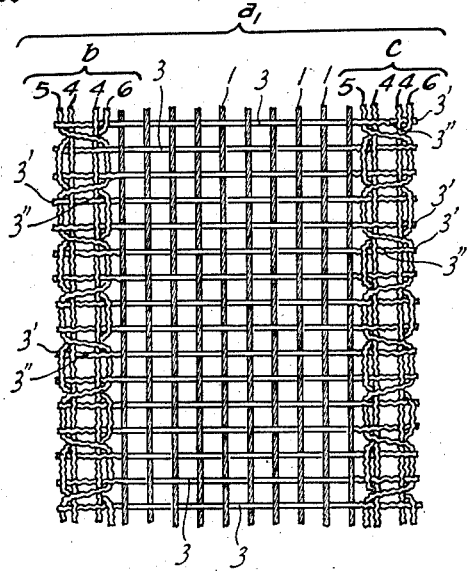
Figure 6 is a fragmentary plan view along the lines of Figures 2 and 4 of the fabric piece illustrated in Figure 5.

When a primary wide fabric woven as shown in Fig. 5, where warp threads 4 of synthetic fibre forming both side parts of each warp thread group are entwined by synthetic fibre yarns of the same kind as threads 4, 5 and 6 as shown in the figure, is thermally treated as above, the weft threads in the neighbourhood of heated metal wires, the warp threads 4 as well as the entwining threads 5 and 6, all of synthetic fibre, become gradually softened and quite viscous. While the weft threads 3 are fused and cut at the points of contact with the heating metal wires 2, the cut end parts will easily adhere to the warp threads 4 and the entwined threads 5 and 6 which are also heated to be soft and viscous. The warp threads 4 and the entwined threads 5 and 6, heated to be in the curly form as shown in Fig. 6, will be fused together twiningly with the curly cut end parts such as 3′ and 3″ of the weft threads 3 also in the heated state to give firm neat selvages $b$ and $c$ to the narrow fabrics to be produced.

According to the requirement of the mode of weave for narrow fabrics to be produced, three different ways of weaving a primary wide fabric such as shown in Figs. 1, 3 and 5 are selectively adopted. Whenever narrow fabrics woven densely with weft threads of synthetic fibre are to be produced, a primary wide fabric of the type shown in Fig. 1 may be most available for the purpose. Here, the fused cut ends of weft threads are found closely with one another along heating wires and so they would be easily fused together one by one to form neat selvages $e$ and $f$, as shown in Fig. 2, on both sides of each narrow fabric to be produced. When, however, weft threads of synthetic fibre are to be interwoven somewhat roughly in a primary wide fabric to be cut, narrow fabrics with neat firm selvages can be produced from a primary fabric of the type shown in Fig. 3 or 5. For the cut end parts of weft threads 3 which are somewhat roughly interwoven would be fused together with warp threads of synthetic fibre 4, or, in the case of a primary fabric as shown in Fig. 5, with warp threads 4 entwined by entwining threads of synthetic fibre 5 and 6, so as to form even in these cases, neat firm selvages such as $d$ shown in Fig. 4 or $b$ and $c$ shown in Fig. 6. In any case of cutting a primary wide fabric by heating, narrow fabrics produced will have neatly selvaged edges if the cut end portions are well finished by means of a heating plate or heating rollers.

As easily understood from what has been described above, this method of producing narrow fabrics by cutting a specially woven primary wide fabric can be successfully applied, whatever may be the kinds of material used for ordinary warp threads 1 shown in Figs. 1, 3 or 5, and also regardless of the kinds of fabric texture or of the features of design weave adopted. As the selvages on both sides of each finished narrow fabric are attained as the result of fusing together of successive cut ends of weft threads 3, or of cut end parts of weft threads 3′ and 3″ and synthetic fibre warp threads 4 near the metal wires 2 interwoven, the finished selvages in any case are not only neat and nice but hardly loosened and highly durable. Instead of the customary method of producing narrow fabrics by means of narrow fabric looms can be employed in the method according to the present invention, ordinary wide fabric looms, wherein is woven a primary wide fabric composed of a certain number of warp thread groups of required material and of heating metal wires intervening between the groups. Therefore, the application of the present invention to the narrow fabric production will effect considerable economy in the funds for plant facilities and also will greatly promote the rate of production. Moreover, it can be given as advantages of the present method that narrow fabrics of different widths such as ribbons, name tapes, muffler tapes, et cetera, can be produced from one wide fabric specially woven so as to serve the purpose, and that ribbon- or tape-like fabrics of different materials or of differently coloured materials can also be manufactured from one wide fabric which has warp thread groups of different kinds. It is, of course, possible in this process to have required letters or figures interwoven into name tapes as in the customary process.

What I claim is:

1. A method of producing narrow fabrics from a specially woven wide fabric wherein the wide fabric is so woven as to be composed of a number of warp thread groups, each containing the required number of threads, of metal wires parallel to the warp threads, each intervening between the warp thread groups, and of synthetic fibre yarns as weft threads, and whenever necessary the fabric has a few synthetic fibre warp threads on both sides of each ordinary warp thread group, comprising cutting the primary wide fabric so that weft threads of synthetic fibre are fused and cut by the interwoven metal wires heated by an electric current, and cut end parts of the weft threads are fused together to form firm neat selvages.

2. A method of producing narrow fabrics as claimed in claim 1, characterized in that a wide fabric is so woven as to be composed of a number of wrap thread groups, each containing the required number of threads, accompanied in parallel with them by a few warp threads of synthetic fibre on both sides of each ordinary warp thread group, and of metal wires, each intervening between the warp thread groups, and of synthetic fibre yarns as weft threads, wherein the weft threads are fused and cut by electrically heated metal wires and the cut end parts are fused together with the synthetic fibre warp threads which are in the neighborhood of each metal wire and are heated to be softened.

3. A method of producing narrow fabrics as claimed in claim 1, characterized in that a wide fabric is so woven as to be composed of a number of warp thread groups, each containing the required number of threads, accompanied in parallel with them and on both sides of each ordinary warp thread group by a few synthetic fibre yarns which are entwined by synthetic fibre yarns so as to form somewhat distinct edge regions for each group, and of metal wires, each intervening between two successive edge regions, and the synthetic fibre yarns as weft threads, wherein the weft threads are fused and cut by electrically heated metal wires and cut end parts are fused together with the synthetic fibre warp threads and the entwining threads which are all in the neighbourhood of each metal wire and are heated to be softened.

4. A method of producing narrow fabrics as claimed in claim 1, wherein the electric current is directly supplied to interwoven metal wires by the contact between rollers and the metal wires, the latter being heated so as to cut a primary wide fabric.

5. A method of producing narrow fabrics as claimed in claim 1, wherein the high frequency secondary electric current is induced in metal wires interwoven in a primary wide fabric, which will be cut by the induced heating current.

References Cited in the file of this patent

UNITED STATES PATENTS 2,035,138　　Maxfield _____ Mar. 24, 1936